United States Patent Office 3,487,298
Patented Dec. 30, 1969

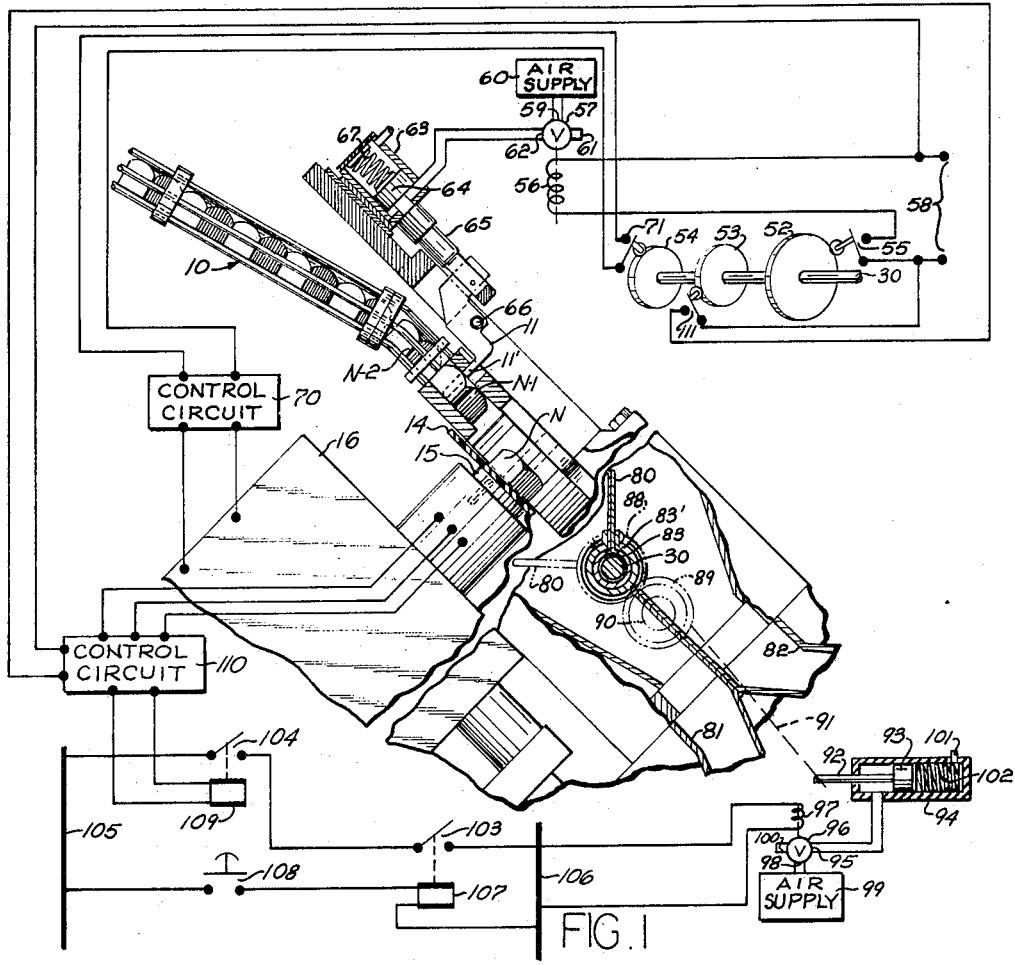
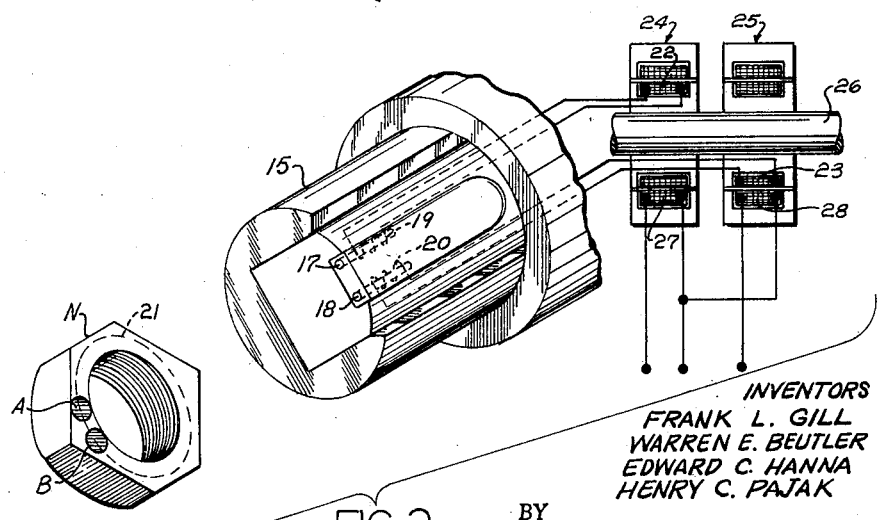
FIG. 1
FIG. 2
INVENTORS
FRANK L. GILL
WARREN E. BEUTLER
EDWARD C. HANNA
HENRY C. PAJAK
BY
*Yount, Flynn and Turolli*
ATTORNEYS

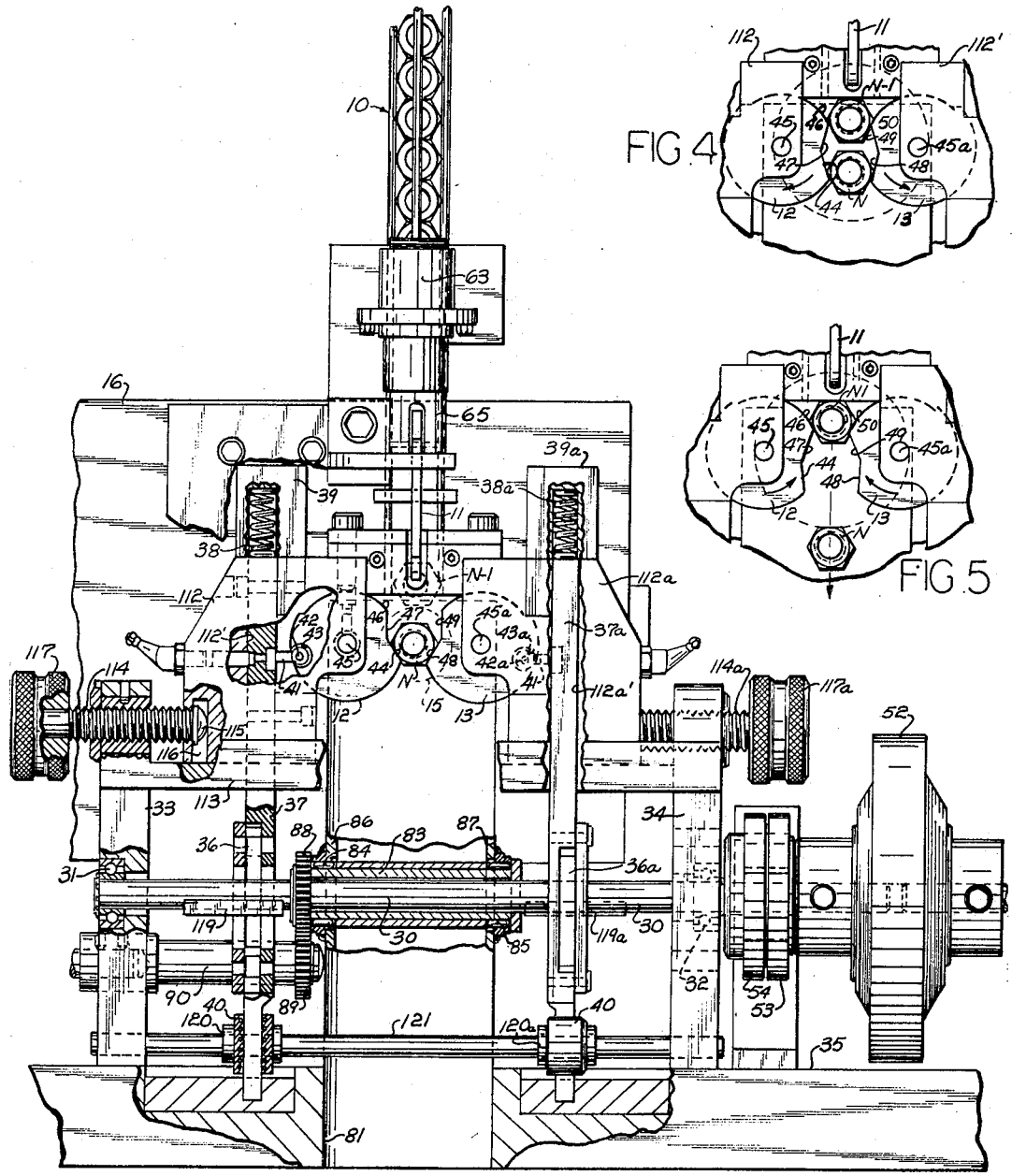

3,487,298
FLAW DETECTION METHOD FOR
ANNULAR ARTICLES
Frank L. Gill, Lakewood, Warren E. Beutler, Willoughby
Hills, Edward C. Hanna, Lakewood, and Henry C.
Pajak, Parma, Ohio, assignors to The Lamson & Sessions Co., Cleveland, Ohio, a corporation of Ohio
Filed Nov. 16, 1967, Ser. No. 683,537
Int. Cl. G01r 33/12
U.S. Cl. 324—37                                 3 Claims

ABSTRACT OF THE DISCLOSURE

In the present invention, a metal nut or similar annular article to be inspected is positioned stationary with one end face engaging one side of a thin dielectric window. On the opposite side of this window a scanning machine having a rotary eddy current probe generates a localized time-varying magnetic field along the annular extent of the nut at a fixed distance from the nut axis to induce eddy currents in the nut which revolve along the annular extent of the nut as the probe is rotated. The probe responds to flaws in the nut by sensing these eddy currents. If a flaw is detected, the nut is rejected following the scanning by the probe. The nuts to be inspected are stacked in a chute down which they slide by gravity before being scanned individually in succession. The nut being scanned is spaced from the stack of nuts in the chute so that the latter cannot affect the probe's response.

---

This invention relates to a method for detecting flaws in annular workpieces of electrically conductive material, such as metal nuts or the like.

Various methods and machines have been proposed heretofore for the non-destructive detection of flaws in metal workpieces of different types, such as bars, tubes, magnetic cores, bearing races and bearing balls. Commonly, such prior arrangements require that the workpiece be moved either longitudinally or rotationally while it is being scanned by the probe, or that the probe be rotated around the circumference of the workpiece being scanned. None of these prior arrangements is efficiently suited for the high speed inspection of annular metal articles, such as nuts or the like, because of the inaccuracies which can occur because of the movement of the article during scanning and/or the excessive time required to complete the scanning of the article.

The present invention is directed to a novel method which overcomes these disadvantages and enables the rapid and accurate non-destructive inspection of metal nuts or other annular articles in a novel and advantageous manner.

Accordingly, it is an important object of the present invention to provide a novel and improved method of detecting flaws in annular articles of electrically conductive material, such as metal nuts or the like.

Also, it is an object of the present invention to provide a novel and improved flaw detection method for non-destructive inspection of annular articles of electrically conductive material, such as metal nuts or the like, at high speed and with great accuracy.

Another object of this invention is to provide a novel method for detecting flaws in annular articles of electrical conductive material, such as metal nuts or the like, in which the article is held stationary while an eddy current probe is rotated past one end face of the article to induce localized eddy currents in the article, with the locality of the eddy currents being revolved along the annular extent of the article as the probe rotates.

Another object of this invention is to provide such a method in which the article to be inspected is positioned stationary with one end face engaging one side of a thin dielectric window and the eddy current probe is on the opposite side of this window at a predetermined distance from this end face of the article, so that the spacing between the probe and the article remains constant throughout the scanning of the article for flaws.

Another object of this invention is to provide such a method wherein a guide is provided for supporting a stack of the articles to slide downward by gravity for inspection individually in succession by a rotary eddy current probe, with the article which is being scanned being maintained spaced from the stack of articles so that the probe response is unaffected by them.

Further objects and advantages of this invention will be apparent from the following detailed description of the embodiment illustrated in the accompanying drawings.

In the drawings:

FIGURE 1 is a view showing a portion of the present apparatus in side elevation, with parts broken away for clarity, and showing other portions of the apparatus schematically;

FIGURE 2 is a view showing in exploded perspective the rotary eddy current probe in relation to the nut which it scans and showing schematically the rotary transformer for this probe;

FIGURE 3 is a front elevational view of the present apparatus, taken from the right end of FIG. 1, with certain parts broken away for clarity;

FIGURE 4 is a fragmentary elevational view showing the escapement mechanism as it is releasing a nut which has just been scanned by the rotary eddy current probe; and FIGURE 5 is a similar view of this escapement mechanism after the nut has been released and just before the next nut will move into position to be scanned.

Referring to FIGS. 1 and 3, the apparatus of the present invention has an inclined chute or guideway 10 down which the nuts to be inspected slide by gravity, with each nut resting on the upper side edge of the nut immediately ahead of it. At the lower end of this chute a pivoted finger 11 (FIG. 3) projects into the central opening in the lowermost nut in the stack to hold the latter against movement downward by gravity until the finger 11 is momentarily displaced counterclockwise in FIG. 1, as described hereinafter.

Spaced below the nut hold-back finger 11 is an escapement mechanism constituted by a pair of pivoted, confronting, nut-positioning jaws 12 and 13 (FIG. 3) which are located on opposite sides of the path of downward travel of the nuts and are normally positioned to engage the lower end of the nut N being inspected.

In accordance with the present invention, the nut N whose lower end is engaged by the jaws 12, 13 directly engages the upper side of a thin, flat dielectric window 14 which is inclined at about 45° to the vertical, as shown in FIG. 1. Immediately beneath this plate is located the rotary scanning head or probe 15 of an eddy current-type flaw detection machine 16 of known design. The axis of rotation of the probe 15 coincides with the axis of the nut N held in position to be scanned.

An accept-reject gate or shutter 80 (FIG. 1) is pivotally mounted below the nut N being scanned. In the full line position shown in FIG. 1 this shutter directs the nut N, when it is released by the jaws 12 and 13 to drop down by gravity, into an "accept" chute. When the shutter 80 is pivoted counterclockwise in FIG. 1 to the position shown in phantom, which occurs in response to the detection of a flaw in the nut as described hereinafter, it directs the released nut to a "reject" chute.

As shown schematically in FIG. 2, the rotary probe 15 of the scanning machine has a pair of spaced, parallel, longitudinally extending magnetizable rods 17 and 18, which are offset radially the same distance from the axis of rotation of the scanning head, and windings 19 and 20 on these rods. The outer ends of these rods revolve in succession along a circular path designated by the dashed line 21 on the flat end face of the nut N in FIG. 2. The probe coils 19 and 20 are connected respectively across respective secondary windings 22 and 23 of a pair of rotary transformers 24 and 25. These secondary windings are mounted on the same rotary shaft 26 as the probe 15 so that they rotate in unison with the probe. The rotary transformers have repective stationary primary windings 27 and 28 which are inductively coupled to the secondary windings.

The primary windings are connected in series with each other to a suitable oscillator (not shown). The oscillator energizes the probe windings 19 and 20 through the respective rotary transformers 24 and 25, and each coil produces a time-varying localized magnetic field adjacent the outer end of the respective rod 17 or 18 as these rods evolve in succession along the circular path indicated by the dashed line 21 on the nut N being scanned. These magnetic fields induce localized eddy currents which circulate in closed paths in the nut N which is then resting on the dielectric window 14 in position to be scanned. The localized areas or spots where these eddy currents are present in the nut are designated by the shaded areas A and B in FIG. 2, which are located directly opposite the respective rods 17 and 18 on the probe 15. Each of these localized eddy current regions is revolved along the annular extent of the nut N as the probe 15 rotates.

The probe senses the eddy currents in the nut being scanned in the following manner:

A discontinuity in the nut N, such as a crack or other flaw in or close to the end face engaging the dielectric window 14 just above the probe, will alter the paths of the eddy currents induced by the probe coil 19 or 20 which is then directly opposite this discontinuity. The discontinuity presents a high resistance barrier which tends to cause the eddy currents to be diverted away from the discontinuity. When this happens, it produces a change in the impedance of the probe coil 19 or 20 which is then directly opposite the discontinuity. Consequently, a flaw in the nut will momentarily affect the impedance of the probe coil 19 which first revolves past it and then it will momentarily affect the impedance of the next probe coil 20 when the latter revolves past the flaw. These momentary time-displaced impedance changes in the probe coils 19 and 29 are sensed by suitable circuitry in the scanning machine 16 which produces a differential probe signal which controls the display provided by an oscilloscope and also operates defect-detecting circuitry for purposes explained hereinafter. The details of this circuitry are omitted as unnecessary to an understanding of the present invention.

Various eddy current flaw detection machines are available, such as the Series DD–60 dynamic defectometer sold by Automation Forster, subsidiary of Automation Industries, Inc., Ann Arbor, Michigan. The particular flaw detector partially depicted schematically in FIG. 2 is merely illustrative of one type suitable for use in the present invention.

Referring to FIG. 3, the nut-positioning jaw 12 has a generally circular peripheral surface 46 for part of its peripheral extent which is concentric with its pivot axis 45. At the laterally outward side of this axis this jaw 12 has a circular recess 43 in its periphery. At its laterally inward side the jaw 12 has a generally V-shaped shallow recess defined by intersecting flat surfaces 44 and 47.

The second nut-positioning jaw 13 is a mirror image of the first jaw 12, with its inwardly-facing, shallow recess being formed by the intersecting flat surfaces 48 and 49.

The angular positions of the jaws 12 and 13 are under the control of a motor-driven drive shaft 30 (FIG. 3). This drive shaft is rotatably supported by ball bearings 31 and 32 which are carried by standards 33 and 34 extending up from the base 35 of the machine.

Toward its left end in FIG. 3 the drive shaft 30 carries a cam 36 which is received in a recess in an upwardly-extending, vertically reciprocable cam follower 37. This cam follower is snugly, but slidably, received in a vertical opening 112′ in a support block 112, which is mounted on the frame of the machine as described hereinafter. A coil spring 38 is engaged under compression between the upper end of the cam follower 37 and an end piece 39 of the top of the support block 112. This spring biases the cam follower downward. The lower end of the cam follower is slidably received in a vertically disposed guide sleeve 40. A short distance below its upper end the cam follower 37 carries a laterally inwardly extending stub 41 having a roller 42 on its inner end which is snugly received in the circular recess 43 in the periphery of the first jaw 12.

With this arrangement, the bias spring 38 normally positions the cam follower 37 downward to the position shown in FIG. 3. In its lowermost position, the cam follower 37 maintains the pivoted jaw 12 in the angular position shown in FIG. 3, in which its flat surface 44 is inclined upward and laterally outward for engagement beneath the downwardly-inclined flat surface on the one side of the hexagonal nut N. Once during each rotation of the drive shaft 30 the cam 36 forces the cam follower 37 upward and, through its connection to the jaw 12, the cam follower turns the latter clockwise in FIG. 3 about its pivot 45 to move its nut-supporting surface 44 down and laterally outward away from the nut N and to move its circular peripheral surface 46 into the path of downward movement of the next nut above.

The angular position of the second jaw 13 is similarly controlled by an identical cam-operated arrangement whose parts are designated by the same reference numerals (with an "a" subscript added) as the just-described elements for controlling jaw 12. The two jaws 12 and 13 are moved in unison with each other.

Referring to FIGS. 3–5, which show the sequence of operation of the jaws 12 and 13, it will be seen that the flat surface 47 on the jaw 12 extends substantially vertically upward from the inner end of the nut-supporting flat surface 44 when jaw 12 is in its extreme counter-clockwise position (FIG. 3) for supporting the nut N being scanned. The flat surface 49 on the second jaw 13 also extends substantially vertically upward when jaw 13 is in its extreme clockwise position, as shown in FIG. 3. In this position of the jaws 12 and 13, the respective surfaces 47 and 49 are spaced apart substantially farther than the corner-to-corner dimension of the nut, so that the nut can drop down between them to rest on their nut-supporting flat surfaces 44 and 48, which incline upward and laterally outward on opposite sides of the nut N.

When the cam followers 37 and 37a are moved upward simultaneously, which occurs once during each rotation of the drive shaft 30, the jaw 12 is turned clockwise and at the same time the jaw 13 is turned counterclockwise from their FIG. 3 positions. During such movements of the jaws, as shown in FIG. 4, their respective nut engaging surfaces 44 and 48 move laterally outward and downward away from engagement with the nut N which had been in position to be scanned, overlying the dielectric window 14, and their circular peripheral surfaces 46 and 50, which extend from the outer ends of the flat surfaces 47 and 49, move beneath the next nut N–1, which is dropping down by gravity after being released by the retaining finger 11, as explained hereinafter. As shown in FIG. 4, this next nut N–1 does not strike the top of the nut N which has just been scanned.

Such movement of the jaws 12 and 13 clockwise and counterclockwise, respectively, in response to the upward movement of the cam followers 37 and 37a, continues until the nut N which has just been scanned drops clear of the jaws. At the same time, the jaws hold the next nut N-1 from dropping down.

After the cam followers 37 and 37a reach the top of their respective strokes they begin to move downward, under the urging of their springs 38, 38a and gravity, causing the jaw 12 to turn counterclockwise and the jaw 13 to turn clockwise as shown in FIG. 5. These return movements of the jaws continue until their curved peripheral surfaces 46 and 50 move clear of the next nut, N-1, and their flat surfaces 44 and 48 move into the path of this nut as it drops down. Finally, in the lowermost positions of the cam followers 37 and 37a, the jaws 12 and 13 will have returned to the positions shown in FIG. 3, in which their flat surfaces 44 and 48 engage and support this nut in position to be scanned by the rotating probe or scanning head 15.

Preferably, the timing of the cam operation of the jaws 12 and 13 is such that each nut is held in a stable position resting directly on the dielectric window 14 in position to be scanned by the scanning head 15 through three or more rotations of the latter, so that the response of the scanning head 15 will be reliable and will not be affected by movement of the nut being scanned. With this arrangement, there is a fixed predetermined spacing between the scanning head or probe and the nut N being scanned, which is very important for an accurate response of the defect-detecting circuitry because the amplitude of the defect signal varies exponentially with this spacing.

The lateral spacing between the jaws 12 and 13 may be adjusted to accommodate different sizes of nuts to be inspected. As shown in FIG. 3 the pivot pin 45 for the first jaw 12 is carried by the aforementioned support block 112, whose lower end rests slidably on a horizontal guide rail 113 which extends laterally of the machine. An adjusting screw 114 is threadedly received in a screw-threaded opening in the standard 33 of the machine frame and it has an enlarged rounded inner end 115 which is held captive in a recess 116 in the support block 112. A knurled knob 117 is attached to the outer end of the adjusting screw.

The cam 36 which operates jaw 12 is keyed to the drive shaft 30 at 119 so that it can slide along the drive shaft.

The vertically disposed guide sleeve 40 which receives the lower end of the cam follower 37 is attached to a tubular support 120 which is freely slidable along a horizontal shaft 121 extending parallel to the drive shaft 30, laterally of the machine.

With this arrangement, the adjusting screw 114 may be turned to move the support block 112 laterally inward or outward to the position desired for the particular size of nut to be inspected. The cam follower 37, cam 36 and guide sleeve 40 move laterally in unison with the support block 112, as does the jaw 12 which it supports pivotally. When the support block 112 is in the desired position along the guide rail 113, it is releasably clamped in place by a manually-operated clamping arrangement (not shown).

A similar arrangement is provided for enabling independent lateral adjustment of the other jaw 13. Corresponding elements of this arrangement have the same reference numerals, with an "a" suffix added, and the description of these elements will not be repeated.

Referring to FIG. 3, the drive shaft 30 of the machine carries three additional cams 52, 53 and 54, which operate corresponding switches to perform various control functions in timed relationship with the just-described operation of the nut-positioning jaws 12 and 13.

Referring to FIG. 1, the cam 52, which is illustrated schematically there, operates a normally-open switch 55 connected in series with the solenoid 56 of a solenoid valve 57 across a suitable power supply 58. The solenoid valve 57 has an inlet port 59 connected to a pressurized air supply 60, an outlet port 61 leading to the atmosphere, and a port 62 connected to the lower end of an air cylinder 63. Normally, i.e., when the valve solenoid 56 is de-energized, the valve 57 connects ports 62 and 61 to each other, thereby venting the lower end of cylinder 63 to the atmosphere, and blocks the air inlet port 59 from both ports 62 and 61. However, when the valve solenoid 56 is energized it operates valve 57 to a position connecting the pressurized air inlet port 59 to the port 62 leading to the air cylinder 63 and it blocks the vent port 61 from both of the other ports 59 and 62.

A piston 64 is reciprocable in the air cylinder 63 and it has a piston rod 65 extending down from the cylinder and pivotally coupled to the nut hold-back finger 11 at the opposite side of the latter's pivot 66 from its nut-engaging extremity 11'. A spring 67 in the cylinder 63 normally biases the piston 64 downward to a position in which it causes the finger 11 to project into the lowermost nut N-1 in the guideway 10 to prevent the latter from moving downward by gravity. The upper end of the cylinder 63 is vented to the atmosphere.

When pressurized air is introduced into the cylinder 63 below the piston 64, the upward movement of the latter pivots the finger 11 counterclockwise in FIG. 1 to release the nut N-1. This occurs once during each rotation of the drive shaft 30, when the cam 52 momentarily closes the switch 55 to complete the energization circuit for the valve solenoid 56, which operates valve 57 to connect its pressurized air inlet port 59 to the port 62 so as to pass pressurized air into the lower end of the cylinder 63. Then, when the switch 55 reopens again, as the rotation of the drive shaft 30 continues, the resulting de-energization of the valve solenoid 56 causes valve 57 to return to its normal position for venting the lower end of the air cylinder 63 to the atmosphere through the valve ports 62 and 61. This permits the piston 64 to move downward, pivoting the finger 11 clockwise about its pivot 66 to position its nut-engaging extremity 11' in the central opening in the next nut N-2 in the stack, which slid down by gravity when the preceding nut N-1 was released.

The retraction of the nut-retaining finger 11 occurs in precisely timed relationship with the opening of the jaws 12 and 13, since all are controlled in response to the rotational position of the drive shaft 30, and the timing is such that the lowermost nut N-1 in the chute 10 is released by the finger 11 while the nut N which has just been scanned is being released by the jaws 12, 13 in the manner indicated in FIGS. 4 and 5.

The flaw detection machine 16 is provided with a control circuit 70 (FIG. 1) which includes a normally-open switch 71 positioned to be operated by the cam 54 on drive shaft 30. When switch 71 is closed by cam 54, which occurs once during each rotation of the drive shaft 30, the circuit 70 disables the flow detection machine 16 from responding to the scanning head 15, even through the latter continues to rotate. The scanning machine 16 is thus disabled during the time when the just-scanned nut N is being released by the jaws 12, 13 and the next nut N—1 is dropping down into engagement with these paws.

The accept-reject shutter 80 below the jaws 12 and 13 is fastened to a generally C-shaped clamp 83' which is rigidly attached to a cylindrical sleeve 83 (FIG. 1) loosely encircling the drive shaft 30. Sleeve 83 is rotatably supported by a pair of axially-spaced needle bearings 84 and 85 (FIG. 3) engaged between the outside of the sleeve and a pair of upstanding walls 86, 87 of the machine frame. A gear 88 is fastened to the left end of sleeve 83 in FIG. 3 so that they turn in unison. Gear 88 meshes with gear 89 attached to a shaft 90.

Shaft 90 is connected through suitable linkage, designated schematically by the dashed line 91 in FIG. 1, to a piston rod 92 attached to a piston 93 which is reciprocable in an air cylinder 94. The linkage 91 causes longitudinal movement of the piston 93 to produce a corresponding rotation of shaft 90, which is imparted through gears 89, 88 to the shutter 80.

The left end of cylinder 94 is FIG. 3 is connected to a port 95 of a solenoid valve 96, which has an operating solenoid 97. Valve 96 has an inlet port 98, connected to an air supply 99, and an outlet port 100 leading to the atmosphere. Normally (i.e., when the solenoid 97 is de-energized) valve 96 connects port 95 to port 100, thereby venting the left end of cylinder 94 to the atmosphere, and its inlet port 98 is closed. Energization of the valve solenoid 97 actuates the valve 96 to a position blocking its vent port 100 and connecting its inlet port 98 to port 95 so as to pass pressurized air from the air supply 99 to the left end of cylinder 94. The right end of cylinder 94 is vented to the atmosphere by a port 101.

A spring 102 biases piston 93 to the left in FIG. 1. This positions the shutter 80 in its "accept" position, shown in full lines in FIG. 3, in which it directs the released nut down into the accept chute 81. However, when valve solenoid 97 is energized, pressurized air is passed into the left end of cylinder 94, moving the piston 93 to the right, and such movement of the piston, acting through the linkage 91 and gears 89, 88, turns the shutter 80 counterlockwise in FIG. 1 to the dashed-line position in which it directs the released nut down into the reject chute 82.

The valve solenoid 97 is connected in series with two sets of normally-open relay contacts 103 and 104 across a pair of power supply lines 105 and 106.

Relay contacts 103 are controlled by a relay coil 107, which is connected in series with a manually-operated, normally-open switch 108 across the power supply lines 105, 106.

Relay contacts 104 are controlled by a relay coil 109, which is connected to a control circuit 110 associated with the scanning head 15 such that when the latter detects a defect or flaw in the nut N being scanned its output signal actuates the control circuit 110 to energize the relay coil 109.

The control circuit 110 is connteced to be controlled by a normally-open switch 111 operated by cam 53 on the drive shaft 30. Switch 111 is closed momentarily during each rotation of the drive shaft and it then resets the control circuit 110 to the normal condition which prevailed before it received a defect-indicating output signal from the scanning head 15. When the control circuit 110 is thus reset, it de-energizes the relay coil 109.

In operation, the operator of the machine manually closes the switch 108 to energize the relay coil 107, which closes its contacts 103 to "arm" the circuit for the valve solenoid 97. The valve solenoid 97 remains de-energized until a defect in the nut N being scanned is detected by the scanning head 15. When this happens, the resulting output signal from the scanning head actuates the control circuit 110 to energize relay coil 109, which then closes its contacts 104 to complete the energization circuit for the valve solenoid 97. The energization of solenoid 97 causes the shutter 80 to be turned to the "reject" position, as described, where it remains until the paws 12, 13 are pivoted to release the just-scanned nut N to drop by gravity down into the reject chute 82. After the release of this nut by the jaws 12, 13, the cam-operated switch 111 is closed momentarily to reset the control circuit 110 to its normal condition, in which it de-energizes relay coil 109. The relay contacts 104 open, de-energizing the valve solenoid 97, so that the piston 93 returns the shutter 80 to its normal position for directing a released nut down into the "accept" chute 81.

If, during the scanning of the nut, no defece is detected by the scanning head 15, the relay coil 109 will not be energized and therefore the shutter 80 will remain in its normal "accept" position, so as to direct the nut released by the jaws 12, 13 down into the "accept" chute 81, and the momentary closing of the cam-operated switch 111 will have no effect on it.

The timing of the various control functions described is determined by the rotational position of the drive shaft 30 in the following sequence:

(1) With the jaws 12, 13 holding the nut N in position to be scanned, during the rotation of the scanning head 15 (which in one practical embodiment has eighteen rotations for each rotation of the drive shaft 30), if a defect is detected the relay coil 109 will be energized to cause shutter 80 to be turned to the "reject" position. If no defect is detected, shutter 80 remains in its normal "accept" position.

(2) After a sufficient number of rotations (e.g., 3½) of the scanning head 15, the drive shaft 30, acting through cams 36, 36a and cam followers 37, 37a, turns the jaws 12, 13 to the release positions so as to permit the previously-scanned nut N to drop down, either into the "accept" chute 81 or the "reject" chute 82, depending upon the position of shutter 80. Simultaneously with the release of the nut N which was just scanned, the cam 52 on drive shaft 30 closes switch 55 momentarily to cause the nut-retaining finger 11 to be retracted so that the next nut N–1 can drop down into position to be scanned. Slightly before the release of the nut N which was being scanned, the cam 54 on drive shaft 30 closes the blanking switch 71 to disable the circuitry in the scanning machine 16 which normally responds to the signals from the scanning head 15, so that the machine 16 does not respond to the signals from the scanning head 15 until the next nut N–1 is in position to be scanned. This prevents the scanning machine from responding to a spurious defect signal caused by the movement of either nut N or N–1.

(3) After the jaws 12, 13 have returned to their closed position, so as to retain in scanning position the nut N–1 which has just been released by the retaining finger 11 and after this nut is at rest in a stable position, the cam 54 on the drive shaft 30 permits switch 71 to re-open so as to de-blank the circuitry in the scanning machine 16, so that now the latter responds to the scanning head 15. Before the completion of the scanning of this new nut N–1 and before it is released by the jaws 12, 13, the cam 53 on drive shaft 30 momentarily closes switch 111. This has no effect on the shutter 80 if the latter is in its "accept" position. However, if it is in its "reject" position the closing of switch 111 causes it to be restored to its "accept" position, where it will remain until a defect is detected in the nut being scanned.

From the foregoing description it will be apparent that the illustrated embodiment of the present apparatus provides for the nut to be positioned with one end face engaging one side of the thin dielectric window 14, with the eddy current probe rotating past the opposite side of this window and producing off-center time-varying magnetic fields which induce localized eddy currents in the nut that revolve along the nut's annular extent as the probe rotates. The stable positioning of the nut against the dielectric window insures that a fixed axial spacing will be maintained between the eddy current probe and the nut, which is very important to the accuracy of the probe's response. While it is being scanned by the rotary probe the nut is physically spaced from the following nuts in the stack, so that the weight of these nuts cannot affect the probe's response either by affecting the position of the nut being scanned or by imposing any stress on the latter. Consequently, the present apparatus enables nuts or other annular articles of electrically conductive material to be tested for flaws at high speed and with great accuracy in the advantageous manner described.

Having described our invention, we claim:

1. A method of detecting flaws in and close to an end face of each nut in a series of nuts, said method comprising the steps of feeding a series of nuts in sequence to an inspection station, positioning each of the nuts in turn at the inspection station with the end face of the nut in a predetermined stationary position, inducing localized eddy currents in said nut by generating a time-varying magnetic field by passing alternating current through a coil, moving the localized eddy currents in an annular path along the stationary end face of the nut by revolving said coil adjacent to the end face of the nut, and detecting the presence of flaws in and close to the end face of the nut by sensing changes in the impedance of said coil due to changes in the localized eddy currents when they encounter a flaw in the nut while moving along the annular path.

2. A method as set forth in claim 1 wherein said method includes the step of maintaining a separation between the nut at the inspection station and the other nuts of the series of nuts.

3. A method as set forth in claim 1 wherein said nut is positioned at said inspection station with the end face thereof engaging one side of a thin dielectric window, said coil being revolved on the opposite side of said window at a fixed axial distance from the end face of the nut.

References Cited

UNITED STATES PATENTS

| | | | |
|---|---|---|---|
| 2,970,256 | 1/1961 | Sazynski et al. | 324—37 |
| 2,970,690 | 2/1961 | Werner | 324—34 X |
| 2,982,402 | 5/1961 | Dion | 324—34 X |

ALFRED E. SMITH, Primary Examiner

U.S. Cl. X.R.

324—40